United States Patent [19]

Nelson et al.

[11] 4,069,571
[45] Jan. 24, 1978

[54] WHEEL CYLINDER PISTON HAVING A FLARED BOSS END AND A METHOD OF FLARING A BOSS END

[75] Inventors: Richard P. Nelson, Bellbrook; William H. Roth, Miamisburg, both of Ohio

[73] Assignee: General Motors Corporation, Detroit, Mich.

[21] Appl. No.: 690,110

[22] Filed: May 26, 1976

[51] Int. Cl.² ............................................. B23P 15/10
[52] U.S. Cl. ............................... 29/156.5 R; 29/420.5; 72/373; 72/377
[58] Field of Search ................ 29/156.5 R, 420.5, 522, 29/509; 264/119; 72/373, 377

[56] References Cited

U.S. PATENT DOCUMENTS

| | | | |
|---|---|---|---|
| 2,199,620 | 5/1940 | Davis | 29/420.5 |
| 2,236,180 | 3/1941 | Kost | 29/522 |
| 2,347,219 | 4/1944 | Schnell | 29/522 |
| 3,014,609 | 12/1961 | Hobbs | 29/522 |
| 3,091,838 | 6/1963 | Hild et al. | 29/522 |

Primary Examiner—C.W. Lanham
Assistant Examiner—Daniel C. Crane
Attorney, Agent, or Firm—D. D. McGraw

[57] ABSTRACT

A wheel cylinder piston is made of sintered powdered metal having a boss provided with a flare on the bossed end surface to assist in holding the wheel cylinder boot in place on the piston. The piston is of the type that directly engages an abutment on a brake shoe instead of utilizing a pin to transmit force between the piston and the brake shoe. The flare is formed by striking a peripherally extending surface section of the boss end with an annular mandrel, the striking action axially compressing a cylindrical portion of the boss and creating an annular shear fracture extending substantially parallel to the center line of the boss. The compressed section extends to a depth controlled by the striking force and stroke and characteristics of the powdered metal material. The sheared cylindrical portion flares outwardly to form a flared end on the boss.

1 Claim, 5 Drawing Figures

WHEEL CYLINDER PISTON HAVING A FLARED BOSS END AND A METHOD OF FLARING A BOSS END

The invention relates to a wheel cylinder piston with a flared boss end and to a method of forming a flared end on a boss having an end surface substantially perpendicular to the boss center line. The boss is illustrated as being part of a wheel cylinder piston made of sintered powdered metal. The method includes the making of the sintered powdered metal part, and striking a peripherally extending surface section of the boss end surface with the annular surface of a mandrel. The boss end surface is struck throughout the area of the peripherally extending surface section in a direction parallel to the boss center line while providing no lateral support to the boss which would tend to prevent flaring of the boss end. The striking action axially compresses a cylindrical portion of the boss under the peripherally extending surface section. This action creates an annular shear fracture extending substantially parallel to the boss center line at the inner edge of the struck peripheral surface. The depth of the annular shear fracture is controlled by the striking force and stroke and characteristics of the powdered metal material. The action causes the sheared cylindrical portion to flare outwardly to form a flared end on a boss.

IN THE DRAWING

The invention includes a wheel cylinder piston and the inventive method is illustrated as being utilized to manufacture a wheel cylinder piston for a drum brake assembly. It may be utilized for other parts, however, which may be made of sintered powdered metal and require an annular flare on the end of a boss.

Figure 1:
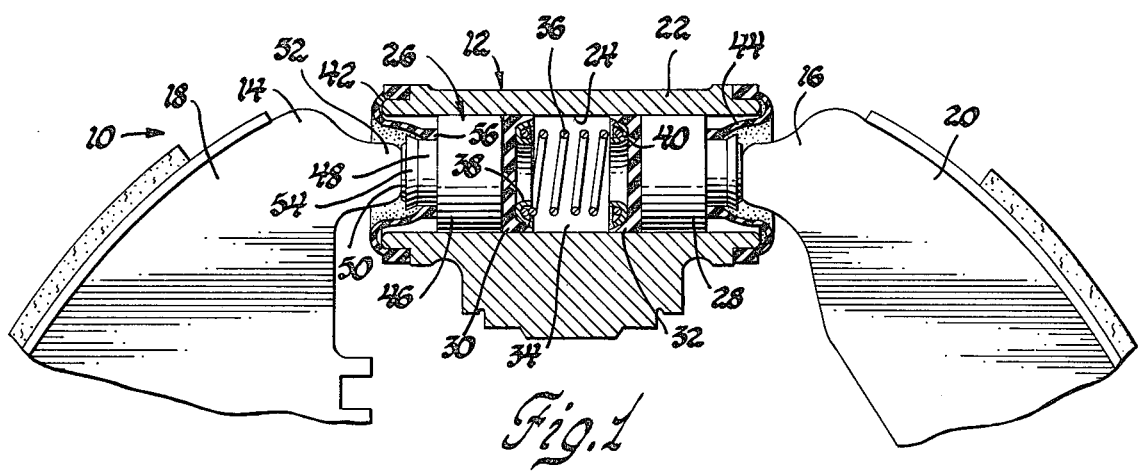
FIG. 1 is an elevation view, with parts broken away and in section, of a portion of a brake shoe assembly having a piston embodying the invention and made by the method embodying the invention.

The brake assembly 10 of FIG. 1 includes a wheel cylinder assembly 12 positioned between the upper ends 14 and 16 of brake shoe assemblies 18 and 20. The wheel cylinder assembly 12 includes a housing 22 with a cylinder bore 24 formed therethrough and containing wheel cylinder pistons 26 and 28. Cups 30 and 32 are respectively associated with pistons 26 and 28 to provide sealing action for the pressure chamber 34 in which brake fluid is pressurized to actuate the brake assembly. The pistons are also urged apart by a spring 36 which acts through spring seats 38 and 40, as is well-known in the art. Wheel cylinder end seals or boots 42 and 44 are provided at each end of bore 24, with their outer peripheries sealingly engaging the bosses formed on the pistons. Since pistons 26 and 28 are identical, only piston 26 will be further described. The piston 26 has a main body section 46 which fits within cylinder bore 24 for reciprocable movement. A boss 48 extends axially outward from body section 46 and has an end surface 50 which abuts an abutment 52 formed on the end 14 of shoe assembly 18. The outer end of boss 48 adjacent end surface 50 is provided with an annular flare 54. The inner periphery 56 of seal 42 fits tightly about the portion of boss 48 between flare 54 and the piston main body section 46. The flare assists in retaining the seal in position on boss 48. It is the formation of this flare, and particularly the method used, that is the subject of the invention.

Figure 2:
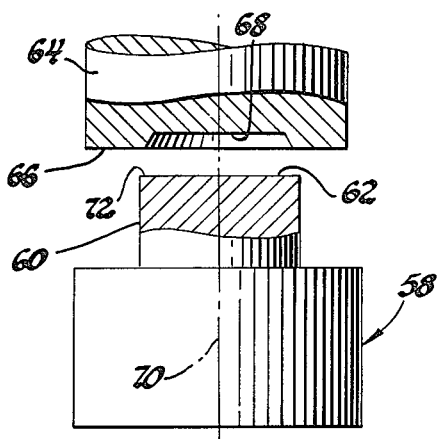
FIG. 2 shows the sintered powdered metal part and the mandrel in their relative positions before the striking step of the method occurs. Parts are illustrated as being broken away and in section.
Figure 3:
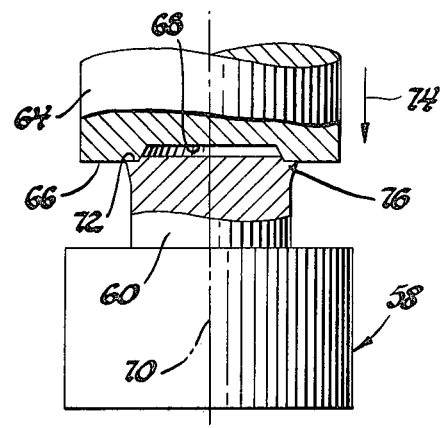
FIG. 3 is similar to FIG. 2 and shows the initial phase of the striking step of the method embodying the invention.
Figure 4:
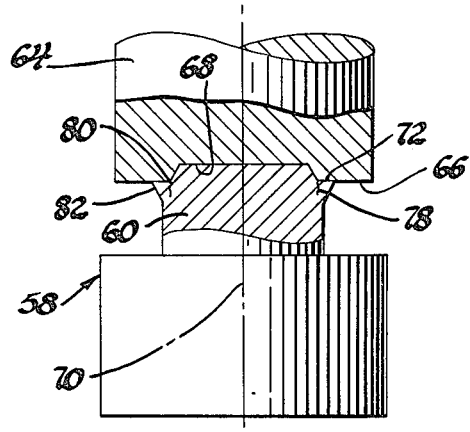
FIG. 4 is similar to FIG. 2 and shows another phase of the striking step of the method embodying the invention.
Figure 5:
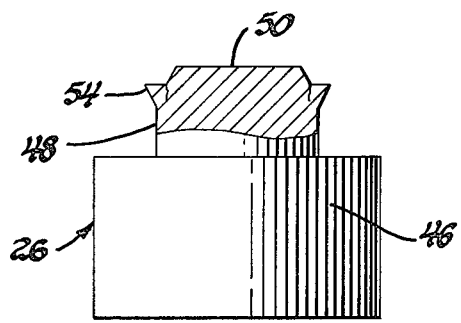
FIG. 5 illustrates the completed sintered powdered metal part, with parts broken away and in section.

In order to form the flare 54, the piston 26 is made from powdered metal. A sintered powdered metal part 58, shown in FIG. 2, has a boss 60 with a boss end surface 62. A mandrel 64 is provided with an annular surface 66 formed about a recess 68. The inner periphery of annular surface 66 is smaller than the boss end surface 62. The mandrel annular surface 66 is axially aligned with the center line 70 of boss 60 so that the inner portion of annular surface 66 axially covers a peripherally extending annular surface section 72 of boss end surface 62. The boss is not provided with any lateral support which would tend to prevent the flaring of the boss end. The mandrel is moved in the direction of arrow 74 along center line 70 so that the mandrel annular surface 66 engages the peripherally extending surface section 72 of boss end surface 62. The striking action of this engagement axially compresses a cylindrical portion 76 of boss 60 under the peripherally extending surface section 72. This compression action on the sintered powdered metal material creates an annular shear fracture 78, shown in FIGS. 4 and 5, which extends substantially parallel to the boss center line 70 at the inner edge 80 of the struck peripheral surface 72 to a depth controlled by the striking force and the stroke of the mandrel, and the characteristics of the powdered metal part. It is the characteristic of the sintered powdered metal part to fracture with an annular shear fracture extending substantially parallel to the boss center line that is the key to the formation of the flare by this method. As the shear fracture develops and the portion 76 is compressed, the portion 76 flares outwardly to form the flare 82 on the end of boss 60. It can be seen that the piston boss 48 is therefore made from boss 60 and the piston flare 54 results from the provision of flare 82. The parts are so identified in FIG. 5 of the drawing.

What is claimed is:

1. A method of forming a flared end on a boss having an end surface substantially perpendicular to the boss center line, said method comprising the steps of:

(a) making a sintered powdered metal part with a boss to be flared;

(b) providing an axially movable mandrel with an annular flat end surface lying in a plane perpendicular to the axis of mandrel movement;

(c) and striking a peripherally extending surface section of the boss end surface with the mandrel annular flat end surface throughout the area of the peripherally extending surface section in a direction parallel to the boss center line while providing no lateral support to the boss which would tend to prevent flaring of the boss end; the striking action axially compressing a cylindrical portion of the boss under the peripherally extending surface section to create an annular shear fracture extending substantially parallel to the boss center line at the inner edge of the struck peripherally extending surface section to a depth less than the length of the boss as controlled by the striking force and stroke of the mandrel annular surface and the compaction characteristic of the powdered metal part while flaring the sheared cylindrical portion outwardly to form a flared end on the boss.

* * * * *